United States Patent
Ishikawa et al.

(10) Patent No.: US 8,504,279 B2
(45) Date of Patent: Aug. 6, 2013

(54) ENGINE AUTOMATIC STOP AND RESTART APPARATUS

(75) Inventors: Osamu Ishikawa, Chiyoda-ku (JP); Tomohisa Shoda, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 296 days.

(21) Appl. No.: 13/090,587

(22) Filed: Apr. 20, 2011

(65) Prior Publication Data

US 2012/0109502 A1   May 3, 2012

(30) Foreign Application Priority Data

Oct. 29, 2010   (JP) ................... 2010-243211

(51) Int. Cl.
*G06G 99/00* (2009.01)
(52) U.S. Cl.
USPC ..... 701/112; 701/113; 123/179.3; 123/179.4; 123/179.25
(58) Field of Classification Search
USPC .............. 123/179.3, 179.4, 179.16, 179.18, 123/179.28, 179.25; 701/112, 113
See application file for complete search history.

(56) References Cited

U.S. PATENT DOCUMENTS

| 2006/0181084 A1* | 8/2006 | Albertson et al. ........... 290/38 R |
| 2009/0020091 A1* | 1/2009 | Botzenhard et al. ........ 123/179.3 |
| 2009/0241883 A1* | 10/2009 | Nagoshi et al. ............ 123/179.4 |
| 2009/0271095 A1* | 10/2009 | Kojima .......................... 701/113 |
| 2010/0251852 A1* | 10/2010 | Murata et al. ................... 74/7 A |

FOREIGN PATENT DOCUMENTS

JP   2000291517 A   * 10/2000

* cited by examiner

*Primary Examiner* — Stephen K Cronin
*Assistant Examiner* — Joseph Dallo
(74) *Attorney, Agent, or Firm* — Sughrue Mion, PLLC (57) ABSTRACT

When an engine automatic stop judgment unit (101) judges that an engine automatic stop condition is satisfied so that a fuel injection control unit (105) stops fuel supply to an engine and an ignition control unit (106) stops ignition of the engine, and when an engine restart judgment unit (102) judges that an engine restart condition is satisfied before the engine stops, the pinion gear is driven to rotate. Then, engagement between the ring gear and the pinion gear is started when a deviation between an rpm of the engine detected by an engine rpm calculation unit (104) and an rpm of the pinion gear becomes smaller than a predetermined threshold value. Ignition by an ignition control unit (106) is inhibited during a period from start of the engagement until an engagement completion judgment unit (103) judges that the engagement is completed.

4 Claims, 10 Drawing Sheets

ENGINE AUTOMATIC STOP AND RESTART APPARATUS

BACKGROUND OF THE INVENTION

1. Field of the Invention

The present invention relates to an engine automatic stop and restart apparatus which automatically stops an engine when a predetermined engine automatic stop condition is satisfied, and restarts the engine when a restart condition is satisfied, thereafter.

2. Description of the Related Art

Conventionally, there is developed an engine automatic stop and restart system for the purpose of improving fuel consumption of an automobile and reducing environmental load, in which when a driver's operation satisfies a predetermined condition for stopping an engine (for example, a brake ON operation at a vehicle speed lower than a predetermined speed), fuel supply is automatically cut off so that the engine is automatically stopped, and after that, when a driver's operation satisfies a predetermined condition for restarting the engine (for example, a brake releasing operation, an accelerator depressing operation, and the like), fuel injection is restarted so that the engine is automatically restarted.

For instance, there is proposed an apparatus having the following structure (see, for example, Japanese Patent Application No. 2010-033545). When a request to restart is issued in a period when engine rotation is decreasing just after the idling stop, if it is judged that an rpm of the engine can be resumed by itself by restarting the fuel supply, the engine is restarted only by restoring the fuel supply without using a starter. In addition, when it is judged that the rpm of the engine cannot be resumed by itself by restarting the fuel supply, the fuel supply is restarted and the starter motor is rotated so that connection or disconnection between a ring gear and a pinion gear is performed based on the rpm of the engine, the rpm of the pinion gear, and a result of the judgment by the engine self-resumption judgment unit.

However, the conventional technology has the following problem.

Figure 12:
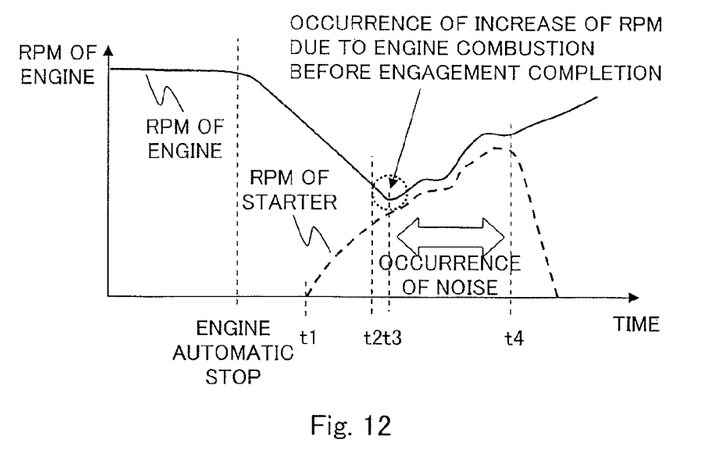
FIG. 12 is an explanatory diagram of a restart operation in a conventional technology.

FIG. 12 is an explanatory diagram of a restart operation in the conventional technology. In the case of the conventional apparatus described in Japanese Patent Application No. 2010-033545, the following operations are performed as illustrated in FIG. 12.

(1) When it is judged that the rpm of the engine cannot be resumed by itself by restarting the fuel supply after the engine stops by the idling stop, the fuel injection is performed simultaneously with a time t1 when the request to restart the engine is issued, and the starter motor is supplied with electricity so as to increase the rpm of the pinion gear, namely the rpm of the starter motor.

(2) Then, engagement between the ring gear and the pinion gear is started at a time t2 when an rpm difference between the rpm of the starter motor and the rpm of the engine becomes smaller than a predetermined rpm difference.

However, when an increase of the rpm of the engine occurs due to combustion of the engine at a time t3 before the engagement between the pinion gear and the ring gear is completed, the rpm deviation between the rpm of the pinion gear and the rpm of the engine is not decreased in the period until it is judged that the restart of the engine is completed at a time t4. Therefore, the pinion gear and the ring gear cannot engage with each other appropriately while having a relative rpm difference, and interfere with each other. Thus, there is a problem that noise (gear stripping sound) and gear abrasion are generated in the restart operation.

SUMMARY OF THE INVENTION

The present invention has been made to solve the above-mentioned problem and an object thereof is to provide an engine automatic stop and restart apparatus capable of obtaining smooth engagement between a pinion gear and a ring gear so as to have good feeling and durability in a restart operation.

An engine automatic stop and restart apparatus according to the present invention includes: an engine ECU including: an engine automatic stop judgment unit which judges whether or not an engine automatic stop condition is satisfied, in accordance with a driving state signal; an engine restart judgment unit which judges whether or not an engine restart condition is satisfied, in accordance with the driving state signal; an engine rpm calculation unit which calculates an rpm of the engine in accordance with a crank angle signal; a fuel injection control unit which stops fuel supply when the engine automatic stop condition is satisfied, and restarts the fuel supply when the engine restart condition is satisfied; and an ignition control unit which stops ignition when the engine automatic stop condition is satisfied, and restarts the ignition when the engine restart condition is satisfied; and a controller which controls a starter motor for starting the engine, based on results of the judgment, calculation, and control made by the engine ECU, in which: the engine ECU further includes an engagement completion judgment unit which judges whether or not a pinion gear for transmitting a torque of the starter motor to a ring gear connected to the engine is completely engaged with the ring gear; the controller drives and rotates the pinion gear when the engine automatic stop judgment unit judges that the engine automatic stop condition is satisfied so that the fuel injection control unit stops the fuel supply to the engine and the ignition control unit stops the ignition of the engine, and when the engine restart judgment unit judges that the engine restart condition is satisfied before the engine stops; and the controller starts engagement between the ring gear and the pinion gear when a deviation between the rpm of the engine detected by the engine rpm calculation unit and an rpm of the pinion gear becomes smaller than a predetermined threshold value, and inhibits the ignition made by the ignition control unit during a period from start of the engagement until the engagement completion judgment unit judges that the engagement is completed.

According to the engine automatic stop and restart apparatus of the present invention, the ignition is inhibited during the period from start of the engagement between the pinion gear and the ring gear until it is judged that the engagement process is completed. Therefore, the fuel that is supplied again simultaneously with a request to restart is prevented from being ignited and combusted before the pinion gear and the ring gear start to engage with each other and complete the engagement so that the rpm of the engine increases. Thus, it is possible to provide an engine automatic stop and restart apparatus capable of obtaining smooth engagement between the pinion gear and the ring gear so as to have good feeling and durability in the restart operation.

DETAILED DESCRIPTION OF THE PREFERRED EMBODIMENTS

Hereinafter, an engine automatic stop and restart apparatus according to the present invention is described with reference to the attached drawings and in accordance with embodiments. Note that, in the drawings, the same or corresponding parts are denoted by the same numeral so that overlapping description is omitted.

First Embodiment

Figure 1:
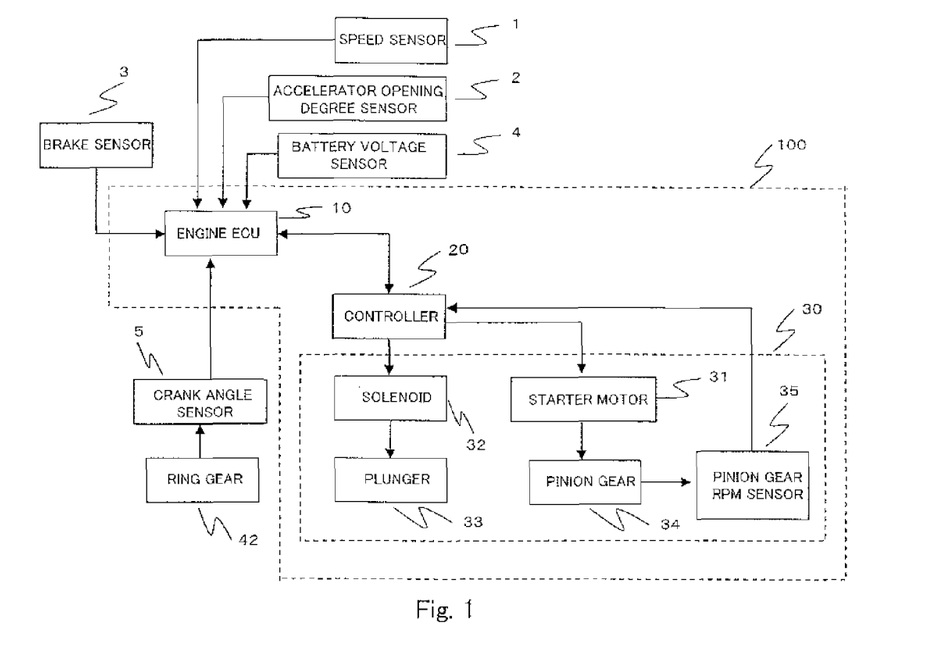
FIG. 1 is a block diagram illustrating a schematic structure of an engine starter unit according to a first embodiment of the present invention.

FIG. 1 is a block diagram illustrating a schematic structure of an engine starter unit according to a first embodiment of the present invention. In FIG. 1, an engine automatic stop and restart apparatus 100 includes an engine ECU 10, a controller 20, and a starter 30. In addition, the engine ECU 10 is connected to various sensors such as a vehicle speed sensor 1, an accelerator opening degree sensor 2, a brake sensor 3, a battery voltage sensor 4, and a crank angle sensor 5.

The vehicle speed sensor 1 detects a speed of a vehicle and outputs a signal corresponding to the detected value as a vehicle speed signal. The accelerator opening degree sensor 2 detects an accelerator opening degree and outputs a signal corresponding to the detected value as an accelerator opening degree signal. The brake sensor 3 outputs a signal indicating an operation state of the brake as a brake signal. The battery voltage sensor 4 detects a battery voltage and outputs a signal corresponding to the detected value as a battery voltage signal.

Further, the crank angle sensor 5 detects a crank angle for determining injection timing and ignition timing of fuel, and outputs a signal corresponding to the detected value as a crank angle signal. The signals from those various sensors become driving state signals indicating driving states of the vehicle by a driver.

The engine ECU 10 judges the engine automatic stop or the engine restart based on the driving state signals from the sensors, so as to instruct the controller 20 and to control fuel injection and ignition of the engine.

The starter 30 includes a starter motor 31, a solenoid 32, a plunger 33, a pinion gear 34, and a pinion gear rpm sensor 35. The controller 20 can control supply of electricity to the starter motor 31 and supply of electricity to the solenoid 32, independently of each other.

The plunger 33 to which rotation of the starter motor 31 is transmitted pushes the pinion gear 34 in the axial direction so that the pinion gear 34 and a ring gear 42 are engaged with each other. The solenoid 32 moves the plunger 33 in the axial direction by being supplied with electricity. In addition, the pinion gear rpm sensor 35 detects an rpm of the pinion gear 34 using a Hall element or the like, and outputs a signal corresponding to the detected value as a pinion gear rpm signal.

Figure 2:
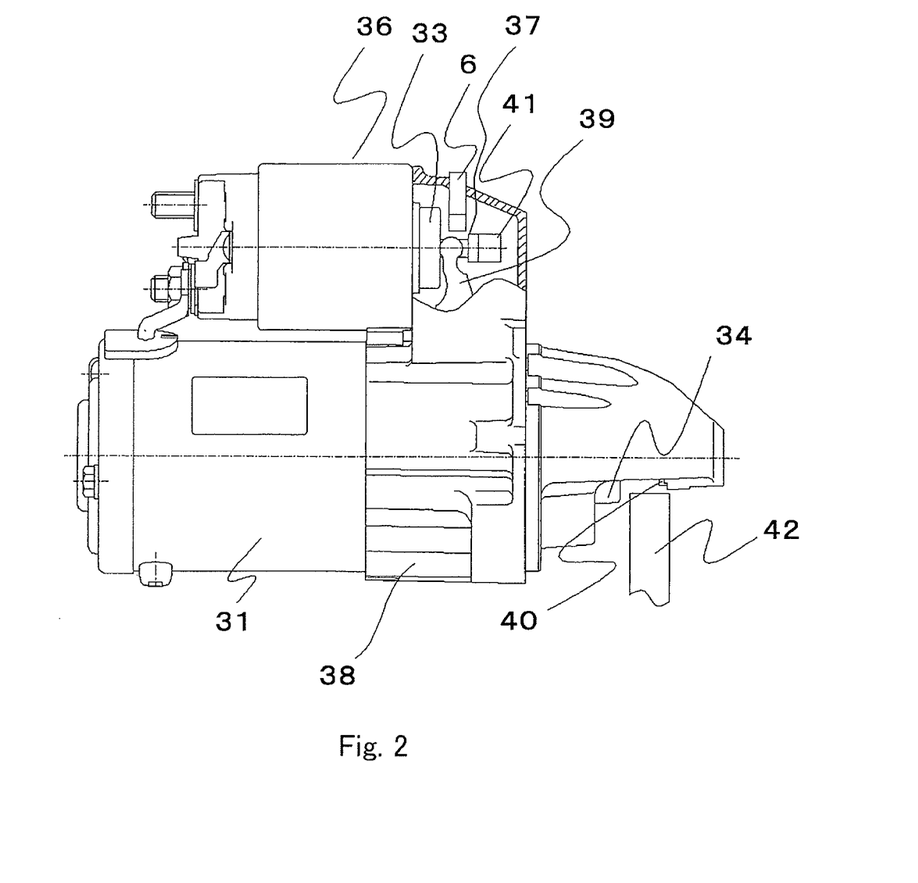
FIG. 2 is a partially broken front view of a starter of an engine automatic stop and restart apparatus according to the first embodiment of the present invention.

FIG. 2 is a partially broken front view of the starter 30 in the engine automatic stop and restart apparatus 100 according to the first embodiment of the present invention. FIG. 2 illustrates a pinion gear position detection unit 6, the starter motor 31, the plunger 33, the pinion gear 34, a switch unit 36, a plunger hook 37, a casing 38, a lever 39, a stopper 40, a magnetic member 41, and the ring gear 42.

In FIG. 2, the starter motor 31 is equipped with a stator and a rotor so that the rotor generates rotary torque by being supplied with electricity. The pinion gear 34 is connected to the rotor of the starter motor 31 via a one-way clutch (not shown) and is movable in the axial direction by a spline shaft or the like.

The above-mentioned one-way clutch transmits the torque of the starter motor 31 to the ring gear 42 via the pinion gear 34 but does not transmit a torque from the ring gear 42 to the starter motor 31. The pinion gear 34 can engage with the ring gear 42 that is connected to the engine when the pinion gear 34 moves from the position illustrated in FIG. 2 to the right in the axial direction.

The switch unit 36 includes the solenoid 32 (not shown) and the plunger 33 that is housed in the internal space of the solenoid 32 and is adapted to be movable in the axial direction. The plunger 33 includes the plunger hook 37 to be described later, and the plunger 33 plus the plunger hook 37 may be referred to as plunger.

The plunger 33 is always biased by a spring (not shown) in the right direction in FIG. 2. When the solenoid 32 is supplied with electricity, the plunger 33 is attracted by the solenoid 32 against the spring force so as to move in the left direction in FIG. 2. On the contrary, when the supply of electricity to the solenoid 32 is cut off, the plunger 33 is moved by the spring force in the right direction in FIG. 2.

The switch unit 36 is fixed to the starter motor 31 integrally by the casing 38. In the switch unit 36, the plunger 33, the solenoid 32, and the lever 39 to be described later constitute a pinion gear drive unit.

One end of the lever 39 is engaged with the plunger hook 37 of the plunger 33, and the other end thereof is engaged with the one-way clutch described above. Further, a part between the one end and the other end is supported by the casing 38 in a rotatable manner. The stopper 40 is disposed on the shaft along which the one-way clutch slides, so as to restrict movement of the pinion gear 34 to the right side in the axial direction.

The magnetic member 41 is fixed to the right end portion of the plunger hook 37 in the axial direction and moves along with the movement of the plunger 33 in the axial direction. The pinion gear position detection unit 6 is fixed to the casing 38 at the position opposed to the outer periphery portion of the plunger hook 37. The pinion gear position detection unit 6 can detect a position in the axial direction of the magnetic member 41 (i.e., a position of the plunger in the axial direction) based on a magnetic coupling degree with the magnetic member 41.

As described above, the plunger 33 is connected to the pinion gear 34 via the lever 39, and the pinion gear 34 moves in the axial direction in association with the movement of the plunger 33 in the axial direction. Therefore, the controller 20 can detect a position of the pinion gear 34 in the axial direction based on the axial direction position of the plunger 33 detected by the pinion gear position detection unit 6.

The pinion gear position detection unit 6 having the structure described above can continuously detect, based on the magnetic coupling degree with the magnetic member 41, the axial direction position of the pinion gear 34 before the right end surface of the pinion gear 34 in the axial direction abuts the left end surface of the ring gear 42 in the axial direction up to the axial direction position of the ring gear 42 when the pinion gear 34 further moves to the right side in the axial direction so that the left end surface thereof in the axial direction abuts the stopper 40.

Next, the operation of the starter 30 is described. In FIG. 2, when the solenoid 32 of the switch unit 36 is supplied with electricity, the plunger 33 is attracted by the solenoid 32 and starts moving to the left side in FIG. 2. Along with this movement of the plunger 33, the one end of the lever 39 engaging with the plunger hook 37 moves toward the solenoid 32, and the lever 39 rotates in the counterclockwise direction.

When the lever 39 rotates in the counterclockwise direction, the other end of the lever 39 engaging with the one-way clutch moves in the right direction in FIG. 2. Thus, the pinion gear 34 is driven by the lever 39 via the one-way clutch to move in the right direction in FIG. 2.

The pinion gear 34 that is driven by the lever 39 to move in the right direction in FIG. 2 eventually abuts the left end surface of the ring gear 42 in the axial direction at the right end surface in the axial direction. After that, the pinion gear 34 further moves to the right side so as to start engaging with the ring gear 42, and further moves to the right side so that the right end surface of the pinion gear 34 in the axial direction abuts the stopper 40 and the pinion gear 34 stops. Then, the pinion gear 34 and the ring gear 42 are engaged completely with each other.

The pinion gear position detection unit 6 detects the axial direction position of the pinion gear 34 moving in the axial direction as described above, and the pinion gear position detection signal indicating the magnetic coupling degree with the magnetic member 41 is supplied to the engine ECU 10. In other words, the pinion gear position detection signal indicating the magnetic coupling degree with the magnetic member 41 when the pinion gear 34 and the ring gear 42 are completely engaged with each other is stored in the engine ECU 10 in advance, to thereby judge by the engine ECU 10 whether or not the pinion gear 34 and the ring gear 42 are completely engaged with each other.

Figure 3:
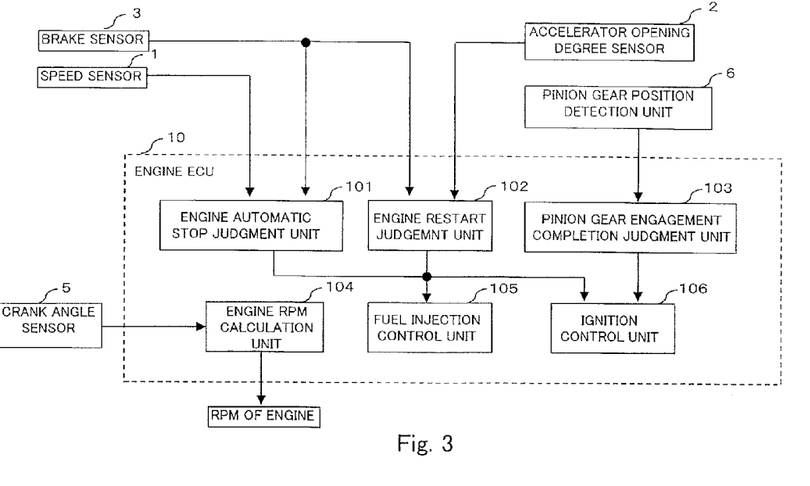
FIG. 3 is a block diagram illustrating a schematic structure of an engine ECU of the engine automatic stop and restart apparatus according to the first embodiment of the present invention.

FIG. 3 is a block diagram illustrating a schematic structure of the engine ECU 10 of the engine automatic stop and restart apparatus 100 according to the first embodiment of the present invention. The engine ECU 10 illustrated in FIG. 3 includes an engine automatic stop judgment unit 101, an engine restart judgment unit 102, a pinion gear engagement completion judgment unit 103, an engine rpm calculation unit 104, a fuel injection control unit 105, and an ignition control unit 106.

The engine automatic stop judgment unit 101 judges whether or not an engine automatic stop condition (for example, a condition that the vehicle speed is 5 km/h or lower and the driver is depressing a brake pedal) is satisfied, in accordance with the brake signal from the brake sensor 3 and the vehicle speed signal from the vehicle speed sensor 1.

The engine restart judgment unit 102 judges whether or not an engine restart condition (for example, a condition that the driver has released the brake and is depressing an accelerator pedal) is satisfied, in accordance with the brake signal from the brake sensor 3 and the accelerator opening degree signal from the accelerator opening degree sensor 2.

The pinion gear engagement completion judgment unit 103 judges whether or not the pinion gear 34 is engaged completely with the ring gear 42 from the position of the pinion gear 34 detected based on the signal indicating the magnetic coupling degree with the magnetic member 41 (illustrated in FIG. 2) from the pinion gear position detection unit 6.

The engine rpm calculation unit 104 calculates the rpm of the engine in accordance with the crank angle signal from the crank angle sensor 5, and outputs a signal corresponding to the calculated value as an engine rpm signal.

The fuel injection control unit 105 controls the fuel injection in accordance with results of judgments by the engine automatic stop judgment unit 101 and the engine restart judgment unit 102. Further, the ignition control unit 106 controls the ignition in accordance with results of judgments by the engine automatic stop judgment unit 101 and the engine restart judgment unit 102 and a result of judgment by the pinion gear engagement completion judgment unit 103.

In addition, the result of judgment of the engine automatic stop condition by the engine automatic stop judgment unit 101, the result of judgment of the engine restart condition by the engine restart judgment unit 102, the result of judgment of the engagement completion by the pinion gear engagement completion judgment unit 103, the result of calculation of the rpm of the engine by the engine rpm calculation unit 104, the result of control by the fuel injection control unit 105, and the result of control by the ignition control unit 106 are transmitted to the controller 20 as information for controlling the starter 30. Then, the controller 20 controls the starter 30 based on the information.

On the other hand, the individual units in the engine ECU 10 can also read the control information in the controller 20 (for example, states of various flags set by the controller 20 as described later).

Note that, the pinion gear 34 usually has fewer teeth than the ring gear 42 has, but for avoiding confusion, the rpm of the pinion gear and the rpm of the engine in the first embodiment are converted in terms of rpm of the ring gear for use, considering a teeth number ratio between the pinion gear and the ring gear.

Figure 4:
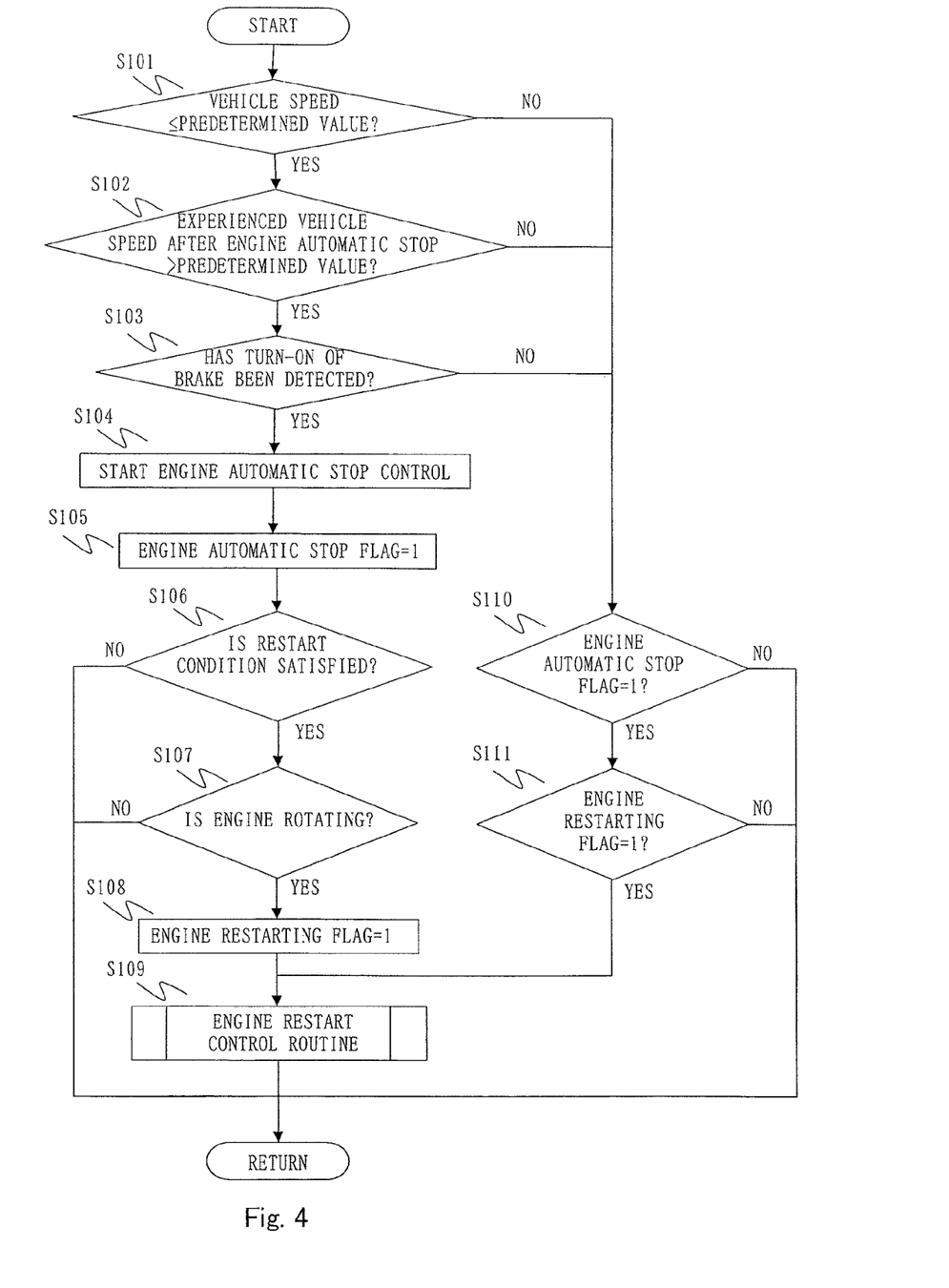
FIG. 4 is a flowchart illustrating a process flow of a fuel cut control routine in the engine automatic stop and restart apparatus according to the first embodiment of the present invention.

Next, a series of operations of the engine automatic stop and restart apparatus according to the first embodiment is described with reference to a flowchart. FIG. 4 is a flowchart illustrating a process flow of a fuel cut control routine in the engine automatic stop and restart apparatus according to the first embodiment of the present invention.

In the fuel cut control routine, first in Steps S101 to S103, the engine automatic stop judgment unit 101 in the engine ECU 10 judges whether or not the engine automatic stop condition is satisfied. Specifically, in Step S101, the engine automatic stop judgment unit 101 judges whether or not the vehicle speed is a predetermined value or lower. Then, if the vehicle speed is the predetermined value or lower, the process proceeds to Step S102. If the vehicle speed is higher than the predetermined value, the process proceeds to Step S110.

In Step S102, the engine automatic stop judgment unit 101 judges whether or not an experienced vehicle speed after the engine automatically stops is higher than a predetermined value. Then, if the experienced vehicle speed is higher than the predetermined value, the process proceeds to Step S103. If the experienced vehicle speed is the predetermined value or lower, the process proceeds to Step S110.

The condition of the experienced vehicle speed is a precondition for performing automatic stop and automatic restart of the engine without causing inappropriate consumption of the battery in the case where a running pattern including creep running, engine automatic stop, engine automatic restart, creep running, and engine automatic restart is repeated in a traffic congestion, for example. Set as the predetermined value for the experienced vehicle speed is a vehicle speed (for example, 10 km/h) at which it can be judged that the vehicle has got out of the traffic congestion and has made a transition from the creep running state to a normal running state in which the accelerator pedal is depressed.

In Step S103, the engine automatic stop judgment unit 101 judges whether or not the brake signal detected by the brake sensor 3 is turned on, namely whether or not the driver is depressing the brake pedal. If it is judged that the brake is turned on, the process proceeds to Step S104 so as to start the engine automatic stop control. If it is judged that the brake is not turned on, the process proceeds to Step S110.

Next, in Step S104, the fuel injection control unit 105 of the engine ECU 10 stops fuel supply to the engine and further the ignition control unit 106 of the engine ECU 10 stops ignition of the engine, to thereby start the engine automatic stop control. Next, in Step S105, the controller 20 judges that the engine is in the stop state, and sets the engine automatic stop flag to 1.

Next, in Step S106, while the rpm of the engine is decreasing due to inertia rotation of the engine, the engine restart judgment unit 102 judges whether or not the engine restart condition (for example, a condition that the driver releases the brake pedal) is satisfied, in accordance with the accelerator opening degree signal detected by the accelerator opening degree sensor 2 and the brake signal detected by the brake sensor 3. As a result of the judgment, if the restart condition is satisfied, the process proceeds to Step S107. If the restart condition is not satisfied, this routine is finished.

Next, in Step S107, the controller 20 judges whether or not the engine is rotating, based on the rpm of the engine calculated by the engine rpm calculation unit 104. If it is judged that the engine is rotating, the process proceeds to Step S108 in which the engine restarting flag is set to 1. After that, the process proceeds to Step S109 and jumps to an engine restart control routine illustrated in FIG. 5.

On the contrary, if the controller 20 judges in Step S107 that the engine is not rotating, namely the engine is stopped completely, this routine is finished. Here, the judgment as to whether or not the engine is rotating may be performed, for example, by judging that the engine is completely stopped if there is no input from the crank angle sensor 5 for a given period and accordingly the rpm of the engine calculated by the engine rpm calculation unit 104 becomes zero.

If the engine automatic stop judgment unit 101 judges that the engine automatic stop condition is not satisfied, namely if the result of the judgment in any one of Steps S101 to S103 is NO, the process proceeds to Step S110.

Next, in Step S110, the controller 20 judges whether or not the engine automatic stop flag is 1. If the engine automatic stop flag is 1, it is judged that the engine is automatically stopped, and the process proceeds to Step S111. On the contrary, if the engine automatic stop flag is 0, the controller 20 judges that the engine is not automatically stopped, and this routine is finished.

Next, in Step S111, the controller 20 judges whether or not the engine restarting flag is 1. If the engine restarting flag is 1, the process proceeds to Step S109 so as to perform the engine restart, and jumps to the engine restart control routine illustrated in FIG. 5. On the contrary, if the engine restarting flag is 0, the controller 20 judges that the engine is not restarting, and this routine is finished.

Figure 5:
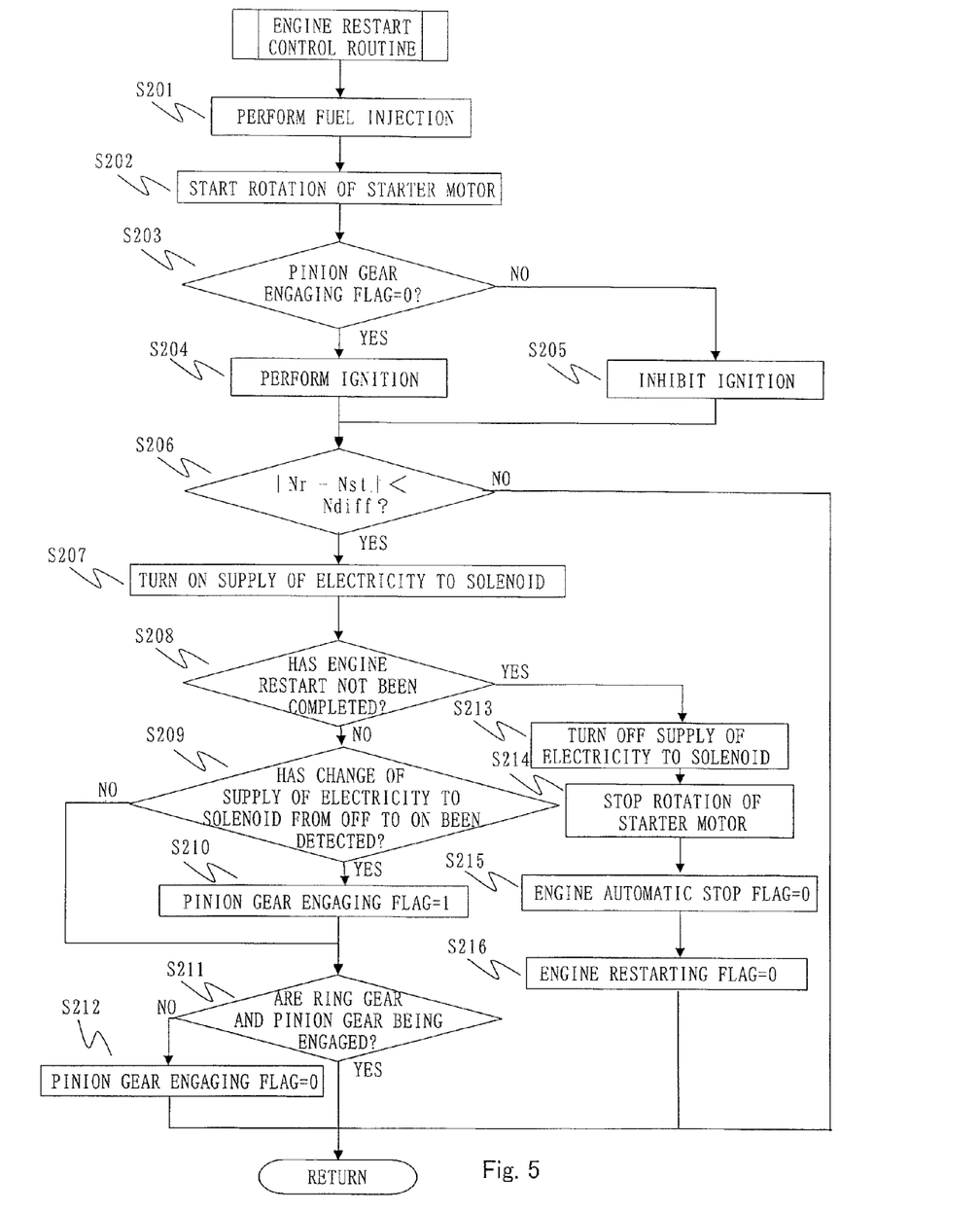
FIG. 5 is a flowchart illustrating a process flow of an engine restart control routine in the engine automatic stop and restart apparatus according to the first embodiment of the present invention.

Next, the engine restart control routine of Step S109 illustrated in FIG. 4 is described. FIG. 5 is a flowchart illustrating a process flow of the engine restart control routine in the engine automatic stop and restart apparatus according to the first embodiment of the present invention.

First, in Step S201, the fuel injection control unit 105 performs the fuel injection. Next, in Step S202, the controller 20 starts rotating the pinion gear 34 by supplying electricity to the starter motor 31. Next, in Step S203, the controller 20 judges whether a pinion gear engaging flag to be described later is 0 or 1.

In this Step S203, if the pinion gear engaging flag is 0, the controller 20 judges that the ring gear 42 and the pinion gear 34 are completely engaged with each other, and the process proceeds to Step S204, in which the ignition control unit 106 performs the ignition. On the contrary, if the pinion gear engaging flag is 1 in Step S203, the controller 20 judges that the ring gear 42 and the pinion gear 34 are not completely engaged with each other, and the process proceeds to Step S205, in which the ignition control unit 106 inhibits the ignition.

Figure 6:
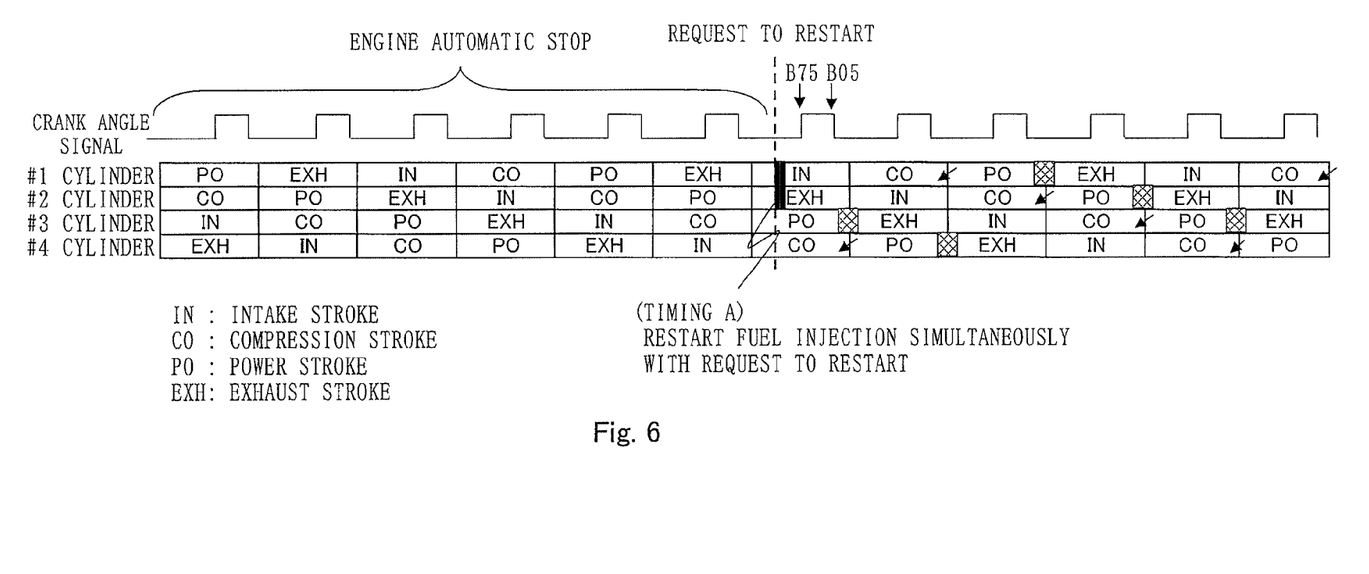
FIG. 6 is a diagram illustrating fuel injection timing and ignition timing of a four-cylinder engine in the first embodiment of the present invention.

Here, the fuel injection and the ignition are described with reference to FIG. 6. FIG. 6 is a diagram illustrating fuel injection timing and ignition timing of a four-cylinder engine in the first embodiment of the present invention. As illustrated in FIG. 6, the fuel injection and the ignition are suspended while the engine is automatically stopped. Then, as for the fuel injection, at the same time as the request to restart, the fuel injection is performed in a predetermined plurality of cylinders (for example, cylinders in the intake stroke and in the exhaust stroke) (corresponding to timing A in FIG. 6).

After that, the fuel injection is performed at a predetermined timing, for example, every crank angle of B05° CA in the power stroke (the part with cross hatching in FIG. 6). As for the ignition, the ignition is restarted at a predetermined timing after the request to restart, for example, every crank angle of B05° CA in the compression stroke (the part indicated by the arrow in FIG. 6).

Following Step S204 or Step S205, in Step S206, the controller 20 compares the rpm difference between the rpm of the engine Nr and the rpm of the pinion gear Nst with a predetermined rpm difference Ndiff (for example, 100 rpm) at which the engagement can be performed. Then, if the rpm difference between the rpm of the engine Nr and the rpm of the pinion gear Nst is smaller than the predetermined rpm difference Ndiff at which the engagement can be performed, the controller 20 judges that the engagement between the pinion gear 34 and the ring gear 42 is possible, and the process proceeds to Step S207.

On the contrary, if the rpm difference between the rpm of the engine Nr and the rpm of the pinion gear Nst is the predetermined rpm difference Ndiff at which the engagement can be performed or larger, the controller 20 judges that the engagement between the pinion gear 34 and the ring gear 42 is impossible, and the process returns to the fuel cut control routine illustrated in FIG. 4.

Next, in Step S207, the controller 20 turns on the supply of electricity to the solenoid 32. In this case, an attraction force is generated between the solenoid 32 and the plunger 33, and the plunger 33 moves in the axial direction. Thus, the pinion gear 34 moves in the axial direction via the lever 39 so that the pinion gear 34 and the ring gear 42 start to engage with each other.

Next, in Step S208, the controller 20 judges whether or not the restart of the engine is not completed. Here, as for the judgment as to whether the restart of the engine is completed or not, the controller 20 judges that the restart of the engine has been completed when the rpm of the engine Nr is larger than a predetermined value (for example, 500 rpm), and judges that the restart of the engine has not been completed yet when the rpm of the engine Nr is smaller than the predetermined value.

When it is judged in Step S208 that the restart of the engine has not been completed yet, the process proceeds to Step S209. On the contrary, when it is judged that the restart of the engine has been completed, the process proceeds to Step S213. Then, in Step S213, the controller 20 turns off the supply of electricity to the solenoid 32. Next, the process proceeds to Step S214, in which the controller 20 stops the rotation of the starter motor 31.

Next, in Step S215, because of the state where the restart of the engine from the engine automatic stop is completed, the controller 20 resets the engine automatic stop flag to 0. Further, in Step S216, the controller 20 resets the engine restarting flag to 0, and the process returns to the fuel cut control routine illustrated in FIG. 4.

On the other hand, when the process proceeds from Step S208 to Step S209, the controller 20 judges whether or not the change of the supply of electricity to the solenoid 32 from the OFF state to the ON state is detected, namely whether or not the engagement between the pinion gear 34 and the ring gear 42 is started. Then, when the controller 20 has detected the change of the supply of electricity to the solenoid 32 from the OFF state to the ON state, the process proceeds to Step S210, in which the pinion gear engaging flag is set to 1.

On the other hand, in Step S209, if the controller 20 has not detected that the supply of electricity to the solenoid 32 is changed from the OFF state to the ON state, the process proceeds to Step S211.

Then, in Step S211, the controller 20 judges whether or not the pinion gear 34 and the ring gear 42 are completely engaged with each other from the axial direction position of the pinion gear 34 detected by the pinion gear position detection unit 6. As a result of the judgment, when the controller 20 judges that the pinion gear 34 and the ring gear 42 are not completely engaged with each other, it is judged that the pinion gear 34 and the ring gear 42 are being engaged with each other. Therefore, the pinion gear engaging flag is still set to 1, and the process returns to the fuel cut control routine illustrated in FIG. 4.

On the other hand, in Step S211, if the controller 20 judges that the pinion gear 34 and the ring gear 42 are completely engaged with each other, the process proceeds to Step S212 in which the pinion gear engaging flag is reset to 0, and the process returns to the fuel cut control routine illustrated in FIG. 4.

Figure 7:
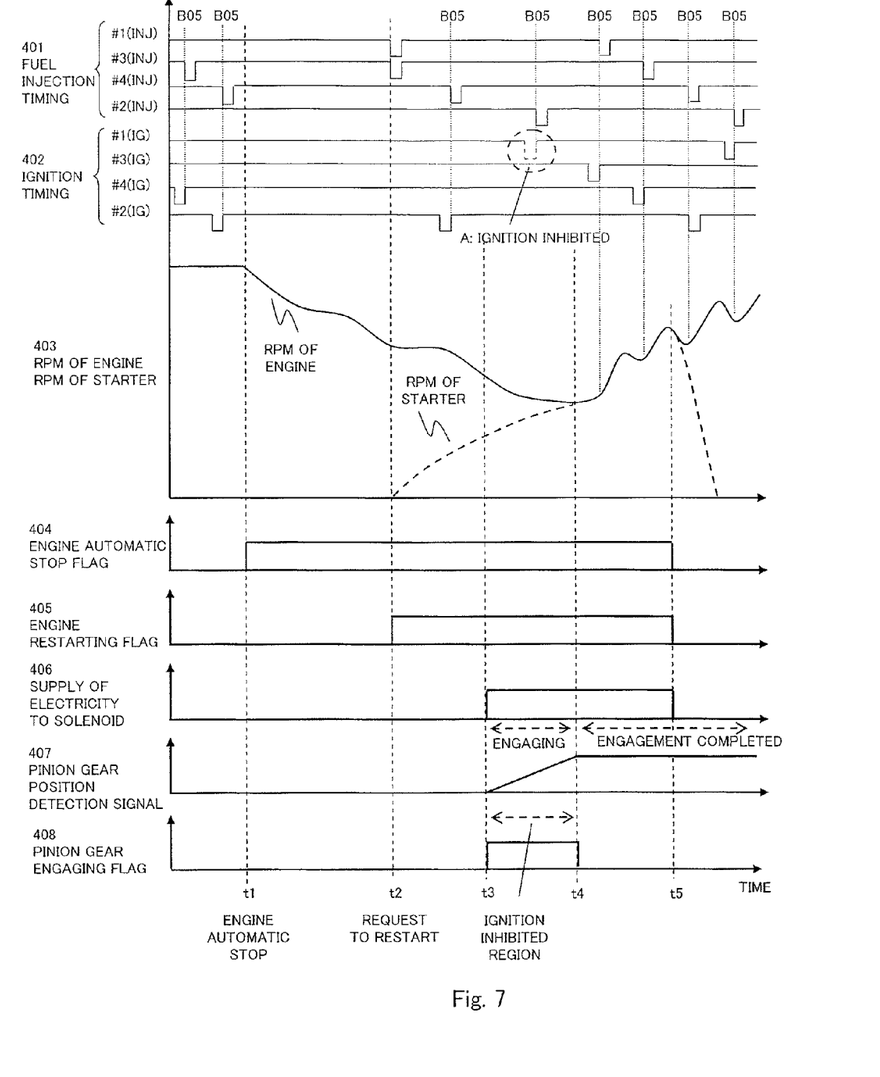
FIG. 7 is a timing chart illustrating an example of an operation in the engine automatic stop and restart apparatus according to the first embodiment of the present invention.

FIG. 7 is a timing chart illustrating an example of the operation in the engine automatic stop and restart apparatus according to the first embodiment of the present invention. The timing chart of FIG. 7 illustrates an operation in the case where the engine automatic stop is performed from the vehicle running state, allowing the pinion gear 34 and the ring gear 42 to engage with each other while the engine is rotating, and the engine restart is performed by cranking of the starter 30.

In FIG. 7, numerals 401 to 408 denote the following items:

401 denotes a fuel injection timing of each cylinder of the engine;

402 denotes an ignition timing of each cylinder of the engine;

403 denotes temporal changes of the rpm of the engine (solid line) and the rpm of the starter (broken line) (i.e., the rpm of the pinion gear Nst);

404 denotes an engine automatic stop flag, which is set to 1 during the engine automatic stop and is reset to 0 when the restart is completed;

405 denotes an engine restarting flag, which is set to 1 during the engine restart and is reset to 0 when the restart is completed;

406 denotes a state of supplying electricity to the solenoid 32, and when the supply of electricity to the solenoid 32 is turned on, an electromagnetic attraction force for moving the plunger 33 in the axial direction is generated so that the pinion gear 34 is moved in the axial direction via the lever 39, thereby engaging the pinion gear 34 and the ring gear 42 with each other;

407 denotes a pinion gear position detection signal, which indicates a pinion gear position from start of the engagement between the pinion gear 34 and the ring gear 42 until the engagement therebetween is completed; and

408 denotes a pinion gear engaging flag, which is set to 1 at the timing when the engagement between the pinion gear 34 and the ring gear 42 is started, namely the timing when the supply of electricity to the solenoid 32 is turned on and the pinion gear 34 starts to move in the axial direction, and is reset to 0 at the timing when the pinion gear position detection unit 6 detects the axial direction position of the pinion gear 34 moving in the axial direction and detects that the pinion gear 34 and the ring gear 42 are completely engaged with each other.

Next, with reference to the timing chart illustrated in FIG. 7, the operation of the engine automatic stop and restart apparatus according to the first embodiment is described. At time t1 when the engine automatic stop condition is satisfied while the vehicle is running, the engine automatic stop flag 404 is set to 1. Then, at time t2 when the engine restart condition (for example, a condition that the driver releases the brake pedal) is satisfied, the starter motor 31 starts to rotate, and simultaneously the fuel injection to a predetermined plurality of cylinders is restarted. Further, the engine restarting flag 405 is set to 1.

After time t2, the fuel injection is performed every crank angle of B05° CA in the power stroke, and the ignition is restarted every crank angle of B05° CA in the compression stroke.

Next, at time t3 when the rpm difference between the rpm of the engine Nr and the rpm of the pinion gear Nst is smaller than the predetermined rpm difference Ndiff at which the engagement can be performed, the supply of electricity to the solenoid 32 is started, the movement of the pinion gear 34 in the axial direction is started, the engagement between the pinion gear 34 and the ring gear 42 is started, and the pinion gear position detection signal 407 starts to change in accordance with the pinion gear position. Then, at the same time as this timing (i.e., at time t3), the pinion gear engaging flag 408 is set to 1.

At time t4, the right end surface in the axial direction of the pinion gear 34 that is moving in the axial direction continuously from the time t3 abuts the stopper 40 so as to stop. Then, the pinion gear position detection signal 407 takes a detected value for judging that the pinion gear 34 and the ring gear 42 are completely engaged with each other, and the rpm of the engine Nr and the rpm of the starter are synchronized with each other. Thus, it is judged that the pinion gear 34 and the ring gear 42 are completely engaged with each other. Then, at the same time as this timing (i.e., at time t4), the pinion gear engaging flag 408 is reset to 0.

From the time t3 to the time t4, the pinion gear engaging flag 408 has a value of 1, and it is judged that the pinion gear 34 and the ring gear 42 are being engaged with each other. Therefore, the ignition is inhibited (an ignition inhibited region is indicated in FIG. 7).

Here, originally, by the ignition at timing A in FIG. 7, the fuel taken into the engine by the fuel injection (#1 (INJ)) at the time t2 is combusted, and first firing occurs, with the result that the rpm of the engine Nr is increased. However, in reality, the ignition at the timing A is inhibited. Therefore, the rpm of the engine 403 (solid line) is not increased by the combustion due to the ignition in the period from the time t3 to the time t4. Then, in the period from the time t4 to time t5, the ignition is restarted again every crank angle of B05° CA in the compression stroke.

At the time t5, the rpm of the engine Nr becomes higher than a predetermined value (500 rpm), and it is judged that the engine can maintain the rotation by itself. Therefore, in order to release the engagement between the pinion gear 34 and the ring gear 42, the controller 20 stops the supply of electricity to the solenoid 32, and resets the engine automatic stop flag 404 and the engine restarting flag 405 to 0.

In this way, while the pinion gear 34 and the ring gear 42 are being engaged with each other, the ignition is inhibited. Therefore, it is possible to improve quietness by suppressing noise (gear stripping sound) that may be generated when the pinion gear 34 and the ring gear 42 cannot be engaged appropriately and interfere with each other, which is caused in a case where the fuel injected in the restart operation is combusted by the ignition during the engagement between the pinion gear 34 and the ring gear 42 so that the rpm of the pinion gear 34 increases (rpm of the engine increases) rather than decreasing to obtain the rpm deviation between the rpm of the pinion gear and the rpm of the ring gear at which the engagement can be performed.

In addition, because the pinion gear 34 and the ring gear 42 can be engaged smoothly with each other, it is possible to suppress gear abrasion so that a long life of the starter can be realized.

As described above, according to the first embodiment, it is judged whether or not the pinion gear is engaged completely with the ring gear based on a result of the detection of the axial direction position of the pinion gear by the pinion gear position detection unit. Further, it is possible to inhibit the ignition during the period from the timing when the supply of electricity to the solenoid is turned on until it is judged that the pinion gear and the ring gear are completely engaged with each other.

Thus, it is possible to improve quietness by suppressing noise (gear stripping sound) that may be generated when the pinion gear and the ring gear cannot be engaged appropriately and interfere with each other. Further, because the pinion gear and the ring gear can be engaged smoothly with each other, it is possible to suppress gear abrasion so that a long life of the starter can be realized.

Second Embodiment

In the description of the first embodiment described above, it is judged whether or not the pinion gear 34 is engaged completely with the ring gear 42, based on a result of the detection of the axial direction position of the pinion gear 34 by the pinion gear position detection unit 6. In contrast, a second embodiment describes a case where it is judged whether or not the pinion gear 34 is engaged completely with the ring gear 42, based on a result of detection of a battery voltage by the battery voltage sensor 4.

Note that, the block diagram illustrating a schematic structure of the engine starter unit is the same as FIG. 1 of the first embodiment described above, and therefore description thereof is omitted. In addition, the structure of the starter 30 is the same as that illustrated in FIG. 2 of the first embodiment described above except that the pinion gear position detection unit 6 and the magnetic member 41 are not disposed, and therefore description thereof is omitted.

Figure 8:
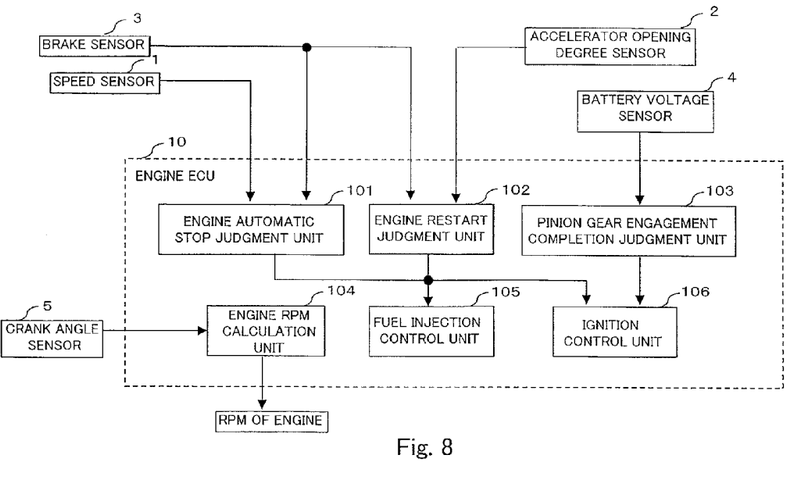
FIG. 8 is a block diagram illustrating a schematic structure of an engine ECU in an engine automatic stop and restart apparatus according to a second embodiment of the present invention.

FIG. 8 is a block diagram illustrating a schematic structure of an engine ECU 10 of an engine automatic stop and restart apparatus 100 according to the second embodiment of the present invention. The engine ECU 10 illustrated in FIG. 8 includes an engine automatic stop judgment unit 101, an engine restart judgment unit 102, a pinion gear engagement completion judgment unit 103, an engine rpm calculation unit 104, a fuel injection control unit 105, and an ignition control unit 106.

Here, comparing with the engine ECU 10 of the first embodiment described above and illustrated in FIG. 3, the engine ECU 10 of the second embodiment illustrated in FIG. 8 is different only in the specific judgment process of the pinion gear engagement completion judgment unit 103. Therefore, the pinion gear engagement completion judgment unit 103 that is the different part is described below.

The pinion gear engagement completion judgment unit 103 in the second embodiment judges that the pinion gear 34 is completely engaged with the ring gear 42 at the timing when a value of a solenoid power supply period counter to be described later, which is calculated based on the battery voltage signal from the battery voltage sensor 4, becomes zero.

Next, a series of operations of the engine automatic stop and restart apparatus of the second embodiment is described with reference to a flowchart. Note that, the fuel cut control routine in the engine automatic stop and restart apparatus according to the second embodiment is the same as that of the first embodiment described above. Therefore, description thereof is omitted, and only the engine restart control routine that is different from that of the first embodiment described above is described as follows.

Figure 9:
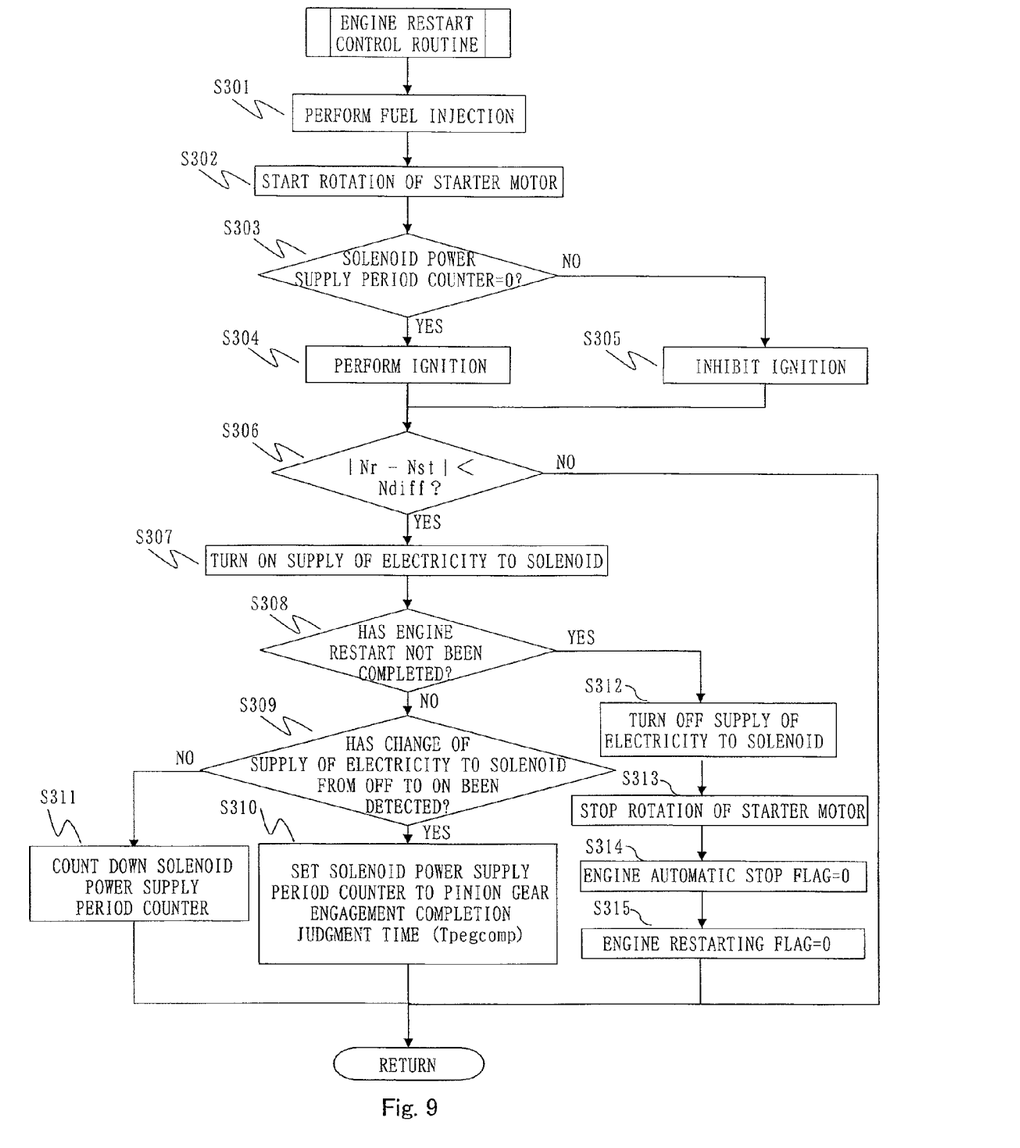
FIG. 9 is a flowchart illustrating a process flow of an engine restart control routine in the engine automatic stop and restart apparatus according to the second embodiment of the present invention.

FIG. 9 is a flowchart illustrating a process flow of the engine restart control routine in the engine automatic stop and restart apparatus according to the second embodiment of the present invention. First, in Step S301, the fuel injection control unit 105 performs the fuel injection. Next, in Step S302, the controller 20 starts to rotate the pinion gear 34 by supplying electricity to the starter motor 31. Next, in Step S303, the controller 20 judges whether or not the solenoid power supply period counter to be described later is 0.

In this Step S303, if the solenoid power supply period counter is 0, the controller 20 judges that the ring gear 42 and the pinion gear 34 are completely engaged with each other, and the process proceeds to Step S304, in which the ignition control unit 106 performs the ignition. On the contrary, if the solenoid power supply period counter is more than 0 in Step S303, the controller 20 judges that the ring gear 42 and the pinion gear 34 are not completely engaged with each other, and the process proceeds to Step S305, in which the ignition control unit 106 inhibits the ignition.

Here, the operations of the fuel injection and the ignition are the same as those of the first embodiment described above and illustrated in FIG. 6, and therefore description thereof is omitted.

Following Step S304 or Step S305, in Step S306, the controller 20 compares the rpm difference between the rpm of the engine Nr and the rpm of the pinion gear Nst with a predetermined rpm difference Ndiff (for example, 100 rpm) at which the engagement can be performed. Then, if the rpm difference between the rpm of the engine Nr and the rpm of the pinion gear Nst is smaller than the predetermined rpm difference Ndiff at which the engagement can be performed, the controller 20 judges that the engagement between the pinion gear 34 and the ring gear 42 is possible, and the process proceeds to Step S307.

On the contrary, if the rpm difference between the rpm of the engine Nr and the rpm of the pinion gear Nst is the predetermined rpm difference Ndiff at which the engagement can be performed or larger, the controller 20 judges that the engagement between the pinion gear 34 and the ring gear 42 is impossible, and the process returns to the fuel cut control routine illustrated in FIG. 4.

Next, in Step S307, the controller 20 turns on the supply of electricity to the solenoid 32. In this case, an attraction force is generated between the solenoid 32 and the plunger 33, and the plunger 33 moves in the axial direction. Thus, the pinion gear 34 moves in the axial direction via the lever 39 so that the pinion gear 34 and the ring gear 42 start to engage with each other.

Next, in Step S308, the controller 20 judges whether or not the restart of the engine is not completed. Here, as for the judgment as to whether the restart of the engine is completed or not, the controller 20 judges that the restart of the engine is completed when the rpm of the engine Nr is larger than a predetermined value (for example, 500 rpm), and judges that the restart of the engine is not completed when the rpm of the engine Nr is lower than the predetermined value.

When it is judged that the engine restart is not completed in Step S308, the process proceeds to Step S309. On the contrary, when it is judged that the engine restart is completed, the process proceeds to Step S312. Then, in Step S313, the controller 20 turns off the supply of electricity to the solenoid 32. Next, the process proceeds to Step S313, in which the controller 20 stops the rotation of the starter motor 31.

Next, in Step S314, because of the state where the engine restart from the engine automatic stop is completed, the controller 20 resets the engine automatic stop flag to 0. Further, in Step S315, the controller 20 resets the engine restarting flag to 0, and the process returns to the fuel cut control routine illustrated in FIG. 4 of the first embodiment described above.

On the other hand, when the process proceeds from Step S308 to Step S309, the controller 20 judges whether or not the change of the supply of electricity to the solenoid 32 from the OFF state to the ON state is detected, namely whether or not the engagement between the pinion gear 34 and the ring gear 42 is started. Then, when the controller 20 detects that the supply of electricity to the solenoid 32 is changed from the OFF state to the ON state, the process proceeds to Step S310, in which the solenoid power supply period counter is set to a predetermined pinion gear engagement completion judgment time Tpegcomp (for example, 50 milliseconds), and the process returns to the fuel cut control routine illustrated in FIG. 4 of the first embodiment described above.

Note that, the pinion gear engagement completion judgment time Tpegcomp can be determined experimentally by measuring the time from the start of supplying electricity to the solenoid 32 until the pinion gear 34 and the ring gear 42 are completely engaged with each other.

Figure 10:
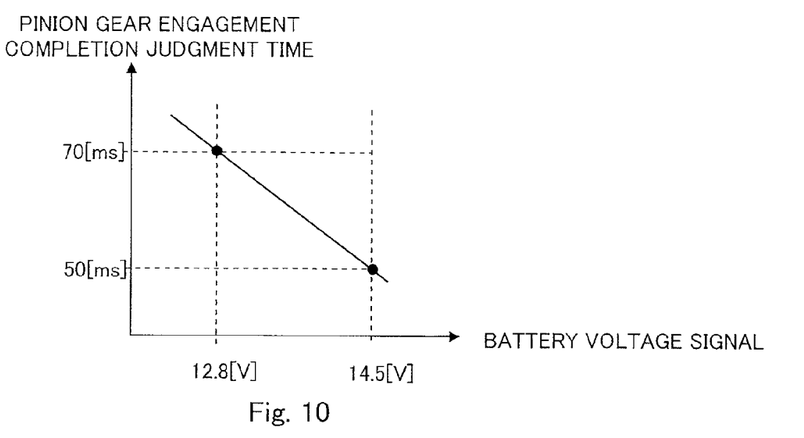
FIG. 10 is a graph illustrating a control map for setting a pinion gear engagement completion judgment time in the engine automatic stop and restart apparatus according to the second embodiment of the present invention.

In addition, the pinion gear engagement completion judgment time Tpegcomp may be set from a control map with a parameter of the battery voltage signal. FIG. 10 is a graph illustrating a control map for setting the pinion gear engagement completion judgment time in the engine automatic stop and restart apparatus according to the second embodiment of the present invention.

In the control map illustrated in FIG. 10, the X axis represents the battery voltage signal, and the Y axis represents the pinion gear engagement completion judgment time Tpegcomp. Further, the control map is set to have characteristics that, as the battery voltage decreases (the attraction force generated between the solenoid 32 and the plunger 33 decreases), the pinion gear engagement completion judgment time Tpegcomp increases.

In FIG. 10, the pinion gear engagement completion judgment time is set to 50 milliseconds when the battery voltage signal is 14.5 V, and is set to 70 milliseconds when the battery voltage signal is 12.8 V, for example. Those set values can be determined experimentally by measuring the time from the start of supplying electricity to the solenoid 32 until the pinion gear 34 and the ring gear 42 are completely engaged with each other under a state where the battery voltage is changed.

On the contrary, when the controller 20 does not detect the change of the supply of electricity to the solenoid 32 from the OFF state to the ON state in Step S309, the process proceeds to Step S311, in which the solenoid power supply period counter is counted down, and the process returns to the fuel cut control routine illustrated in FIG. 4 of the first embodiment described above.

Figure 11:
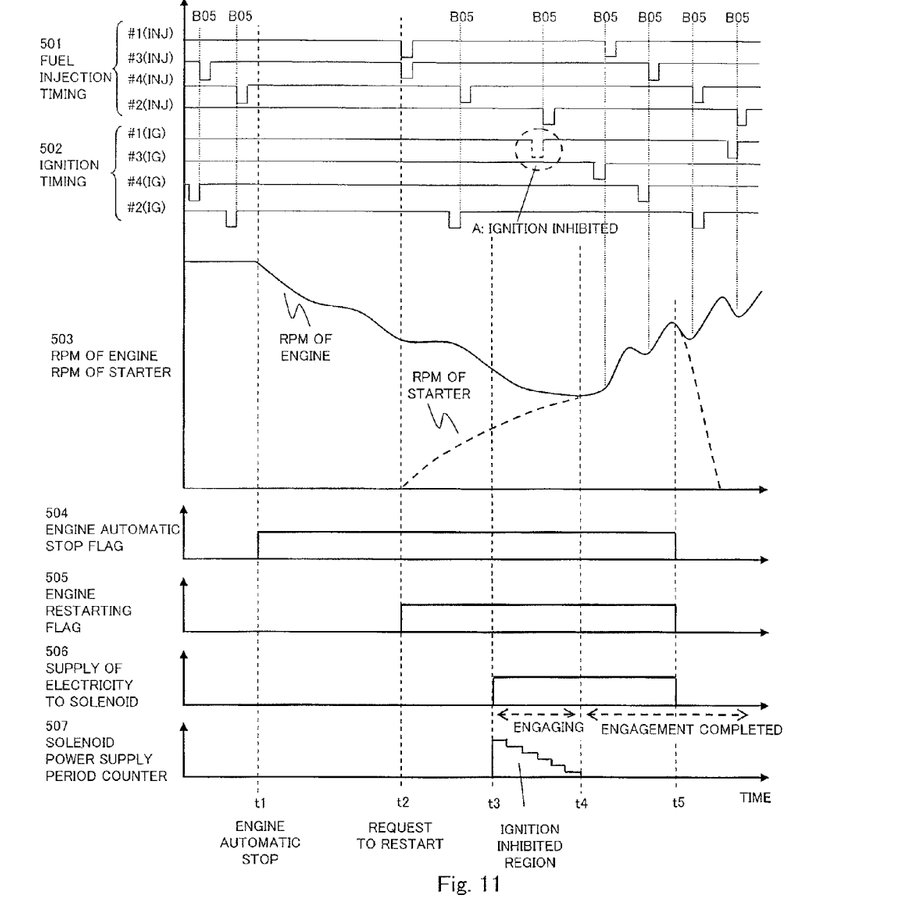
FIG. 11 is a timing chart illustrating an example of an operation in the engine automatic stop and restart apparatus according to the second embodiment of the present invention.

FIG. 11 is a timing chart illustrating an example of the operation of the engine automatic stop and restart apparatus according to the second embodiment of the present invention. In FIG. 11, numerals 501 to 506 denote the same items as numerals 401 to 406 illustrated in FIG. 7 of the first embodiment described above. In addition, numeral 507 denotes the following item: 507 denotes a manner of change of the solenoid power supply period counter.

In the timing chart illustrated in FIG. 7 of the first embodiment described above, the time t4 when it is judged that the pinion gear 34 and the ring gear 42 are completely engaged with each other is the timing when the pinion gear position detection signal 407 takes a detected value for judging that the pinion gear and the ring gear are completely engaged with each other.

In contrast, in the timing chart illustrated in FIG. 11 of the second embodiment, the above-mentioned timing is the timing when the solenoid power supply period counter that is set to the pinion gear engagement completion judgment time at the time t3 becomes 0. Other than that, the timing chart for describing the operation of the engine automatic stop and restart apparatus in the second embodiment is the same as that in the first embodiment described above, and therefore description thereof is omitted.

As described above, according to the second embodiment, instead of detecting an actual pinion gear position by the pinion gear position detection unit, the lapse time from the timing when the supply of electricity to the solenoid is turned on is measured. Then, it is judged that the pinion gear and the ring gear are completely engaged with each other at the timing when the measured time becomes the pinion gear engagement completion judgment time Tpegcomp. Further, the ignition can be inhibited in the period from the timing when the supply of electricity to the solenoid is turned on until the pinion gear and the ring gear are completely engaged with each other.

Thus, it is not necessary to provide the pinion gear position detection unit unlike the first embodiment described above. Therefore, it is possible to suppress a cost increase of the system and, similarly to the first embodiment described above, to suppress noise (gear stripping sound) that may be generated when the pinion gear and the ring gear cannot be engaged appropriately and interfere with each other so that quietness can be improved. Further, because the pinion gear and the ring gear can be engaged smoothly with each other, it is possible to suppress gear abrasion so that a long life of the starter can be realized.

In addition, the pinion gear engagement completion judgment time Tpegcomp is set to a larger value as the battery voltage becomes lower, namely as the attraction force generated between the solenoid 32 and the plunger 33 becomes smaller. Therefore, even if a decrease of the battery voltage occurs due to deterioration of the battery or frequent engine restart, the timing when the pinion gear and the ring gear are completely engaged with each other can be judged correctly. As a result, it is possible to suppress reliably the noise (gear stripping sound) and the gear abrasion that may be generated when the pinion gear and the ring gear cannot be engaged appropriately and interfere with each other.

What is claimed is:

1. An engine automatic stop and restart apparatus, comprising:
    an engine ECU comprising:
        an engine automatic stop judgment unit which judges whether or not an engine automatic stop condition is satisfied, in accordance with a driving state signal;
        an engine restart judgment unit which judges whether or not an engine restart condition is satisfied, in accordance with the driving state signal;
        an engine rpm calculation unit which calculates an rpm of an engine in accordance with a crank angle signal;
        a fuel injection control unit which stops fuel supply when the engine automatic stop condition is satisfied, and restarts the fuel supply when the engine restart condition is satisfied; and
        an ignition control unit which stops ignition when the engine automatic stop condition is satisfied, and restarts the ignition when the engine restart condition is satisfied; and
    a controller which controls a starter motor for starting the engine, based on results of the judgment, calculation, and control made by the engine ECU,
    wherein the engine ECU further comprises an engagement completion judgment unit which judges whether or not a pinion gear for transmitting a torque of the starter motor to a ring gear connected to the engine is completely engaged with the ring gear,
    wherein the controller drives and rotates the pinion gear when the engine automatic stop judgment unit judges that the engine automatic stop condition is satisfied so that the fuel injection control unit stops the fuel supply to the engine and the ignition control unit stops the ignition of the engine, and when the engine restart judgment unit judges that the engine restart condition is satisfied before the engine stops, and
    wherein the controller starts engagement between the ring gear and the pinion gear when a deviation between the rpm of the engine detected by the engine rpm calculation unit and an rpm of the pinion gear becomes smaller than a predetermined threshold value, and inhibits the ignition made by the ignition control unit during a period from start of the engagement until the engagement completion judgment unit judges that the engagement is completed.

2. An engine automatic stop and restart apparatus according to claim 1, further comprising a pinion gear position detection unit which detects a position at which the pinion gear is engaged completely with the ring gear,
    wherein the engagement completion judgment unit judges whether or not the engagement is completed based on a result of the detection made by the pinion gear position detection unit.

3. An engine automatic stop and restart apparatus according to claim 1, wherein the engagement completion judgment unit judges that the engagement between the ring gear and the pinion gear is completed when a predetermined period passes after the engagement is started by the controller.

4. An engine automatic stop and restart apparatus according to claim 3, wherein the engagement completion judgment unit monitors a battery voltage corresponding to an attraction force generated between a solenoid and a plunger which are included in a pinion gear drive unit for causing the pinion gear to engage with the ring gear, and changes a set value of the predetermined period in accordance with a level of the battery voltage.

* * * * *